Inventor:
Oskar Anton Wiberg
His Attorney

UNITED STATES PATENT OFFICE.

OSKAR ANTON WIBERG, OF FINSPONG, SWEDEN, ASSIGNOR, BY MESNE ASSIGNMENTS, TO AKTIEBOLAGET LJUNGSTRÖMS ÅNGTURBIN, OF STOCKHOLM, SWEDEN, A CORPORATION.

ELASTIC-FLUID TURBINE.

1,271,402.　　　　　Specification of Letters Patent.　　Patented July 2, 1918.

Application filed August 8, 1917. Serial No. 185,036.

*To all whom it may concern:*

Be it known that I, OSKAR ANTON WIBERG, a subject of the King of Sweden, residing at Finspong, Sweden, have invented certain new and useful Improvements in Elastic-Fluid Turbines, of which the following is a specification.

The present invention relates to elastic-fluid turbines of the radial flow type in which elastic fluid is admitted around the shaft to the blade rings from an annular elastic-fluid distributer or steam chest.

Heretofore such distributers or chests have been made with closed annular elastic-fluid passages from which the elastic fluid has been distributed around the shaft to the blade system through narrow annular openings or through holes in the walls of the distributer. With such constructions it is difficult, or even impossible, to machine or finish the inner surfaces of the elastic-fluid passages, a thing which it is very desirable to do owing to the fact that, in casting the distributer, particles are liable to adhere to such surfaces which may come off and be carried into the interior of the turbine where they may cause damage.

The object of the present invention is to provide a distributer of improved structure in which all the surfaces which define the passages for the flow of elastic fluid are readily accessible for machining and finishing.

For a consideration of what I believe to be novel and my invention, attention is directed to the accompanying specification and the claims appended thereto.

Figure 1:
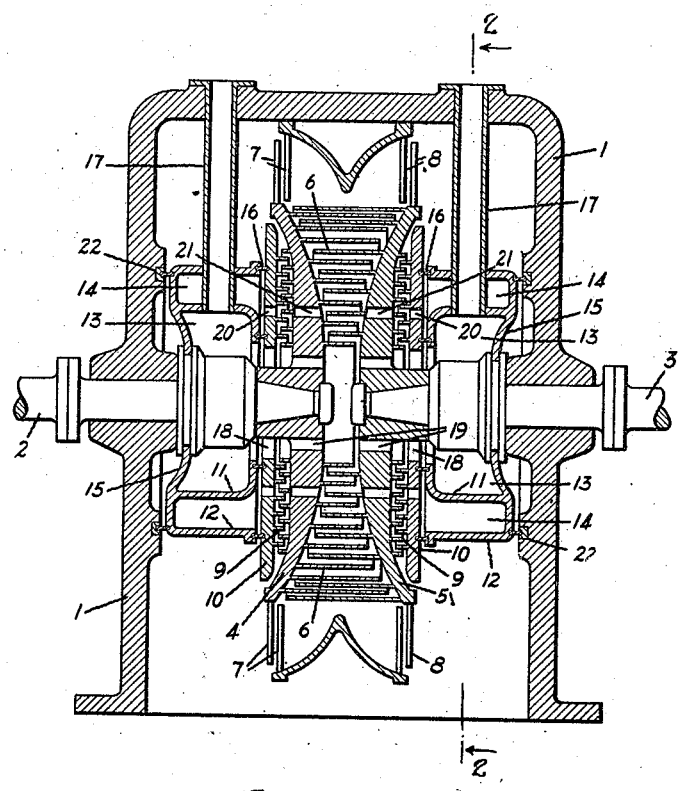
Figure 2:
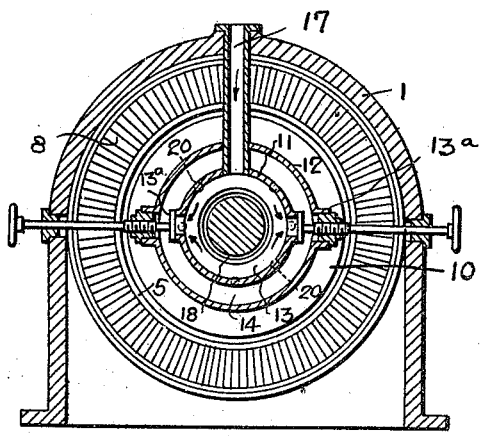

In the drawing Figure 1 is a longitudinal sectional view of an elastic-fluid turbine embodying one form which my invention may take, and Fig. 2 is a section taken on line 2—2, Fig. 1.

Referring to the drawing, 1 indicates the casing of a turbine and 2 and 3 shafts carrying rotors 4 and 5 which rotate in opposite directions. Carried by the rotors 4 and 5 is an inner radial blade system 6 comprising interleaving rings of blades, and two outer axial blade systems 7 and 8, one associated with each rotor. 9 indicates suitable labyrinth packings arranged between the rotors 4 and 5 and stationary disks 10 to prevent leakage. The disk 10 serves as a pressure disk, receiving the axial pressure or taking the axial thrust of the elastic fluid in the packing 9. Arranged one on each side of the turbine and surrounding the shafts are elastic fluid distributers or chests, each comprising two annular walls 11 and 12 concentric with the shafts and forming between them annular chambers 13 and 14. The one end of each of these chambers is closed by an integral end wall 15 and the other end by one of the packing carrying disks 10 to which the walls 11 and 12 are connected by annular expansion rings 16. Elastic fluid is supplied to the chambers 13 through conduits 17, and to the chambers 14 from chambers 13 through suitable valves 13ᵃ in walls 11; or separate conduits similar to conduits 17 may be supplied for the purpose. From chamber 13 elastic fluid flows to the blade rings by way of annular passage 18 in disk 10 and openings 19 in the rotors 4 and 5. Elastic fluid is supplied to the turbine from chambers 14 in case of overload and, when so supplied, flows through openings 20 in stationary disks 10 and openings 21 in rotors 4 and 5 to the blade rings at an intermediate point, as is well understood. The distributers, as already stated, are supported on the disks 10 by annular expansion rings 16 and they are supported on the casing 1 by similar annular rings 22. The rings 16 and 22 are comparatively thin and have thickened edges which are embedded in suitable grooves in the parts which they join together to form a tight connection.

As is clear from the drawing, in a distributer as illustrated and described all the surfaces of the elastic-fluid passages can be readily machined and finished. This is made possible by leaving the passages open at one end, such end being then closed by the insertion of the distributer into the turbine and the connection of the same to an adjacent fixed part of the turbine. In other words, the distributer is formed with an open end which is closed by a fixed wall of the turbine. If found desirable the distributer may be formed in two or more parts suitably fastened together. For example, it may be split horizontally on the axis of the shaft.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. An elastic fluid turbine having a distributer from which elastic fluid is supplied to the turbine, said distributer comprising walls which form an annular chamber open at one end whereby the walls of said chamber may be machined and finished, and annular expansion rings connecting said distributer to stationary walls of the turbine, one such stationary wall forming a closure for the open end of the distributer.

2. In an elastic fluid turbine, the combination of a casing, two rotors therein having interleaving axially extending blade rings thereon, said rotors rotating in opposite directions, shafts for said rotors, and a distributer from which elastic fluid is supplied to the turbine, said distributer comprising walls which form an annular chamber open at one end whereby said walls may be machined and finished, and means connecting said walls to stationary portions of the turbine casing, certain of said portions forming closures for the open ends of said distributers.

3. An elastic-fluid turbine having a distributer from which elastic fluid is supplied to the turbine, said distributer having concentric walls forming a plurality of annular chambers, said chambers being open at one end whereby their inner surfaces may be machined and finished.

4. An elastic-fluid turbine having a distributer from which elastic fluid is supplied to the turbine, said distributer having concentric walls forming an annular chamber open at one end whereby the walls of said chamber may be machined and finished, and annular expansion rings connecting said distributer to stationary walls of the turbine, one such stationary wall forming a closure for the open end of the distributer.

5. An elastic-fluid turbine having a distributer from which elastic fluid is supplied to the turbine, said distributer having concentric walls forming a plurality of annular chambers, said chambers being open at one end whereby their inner surfaces may be machined and finished, and expansion rings connecting the distributer to stationary walls of the turbine, said stationary walls forming closures for the open ends of the chambers in the distributer.

6. In an elastic-fluid turbine, the combination of a casing, two rotors therein having interleaving axially extending blade rings thereon, said rotors rotating in opposite directions, shafts for said rotors, and a distributer on each side of the casing for supplying elastic fluid to the blade rings, said distributers comprising concentric walls which surround the shafts and form annular chambers, said chambers being open on one end, and stationary disks to which said distributers are connected and which form closures for the open ends of said distributers.

7. In an elastic-fluid turbine, the combination of a casing, two rotors therein having interleaving axially extending blade rings thereon, said rotors rotating in opposite directions, shafts for said rotors, balancing disks on opposite sides of the turbine, a labyrinth packing between said rotors and the disks, a distributer on each side of the casing for supplying elastic fluid to the blade rings, said distributers comprising concentric walls which surround the shafts and form annular chambers, said chambers being open at one end, and expansion rings connecting the distributers to said pressure disks, said disks forming closures for the open ends of the chambers and being provided with openings through which elastic fluid flows to the blade rings.

In witness whereof, I have hereunto set my hand this 21st day of June, 1917.

OSKAR ANTON WIBERG.